(12) United States Patent
Selman et al.

(10) Patent No.: US 8,166,911 B2
(45) Date of Patent: May 1, 2012

(54) METHOD AND APPARATUS FOR ELECTROSTATIC SPRAY DEPOSITION FOR A SOLID OXIDE FUEL CELL

(75) Inventors: Jan Robert Selman, Chicago, IL (US); Hiroshi Nomura, Chiba (JP); Said Al-Hallaj, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 846 days.

(21) Appl. No.: 11/726,716

(22) Filed: Mar. 22, 2007

(65) Prior Publication Data
US 2008/0029026 A1 Feb. 7, 2008

Related U.S. Application Data

(63) Continuation-in-part of application No. 10/701,396, filed on Nov. 4, 2003, now Pat. No. 7,252,851.

(51) Int. Cl.
*B05B 5/025* (2006.01)
*B05C 11/00* (2006.01)

(52) U.S. Cl. ........ 118/624; 118/621; 118/628; 118/629; 118/504; 239/706

(58) Field of Classification Search .......... 118/621–638; 239/690–708, 599–602, 397.5; 427/457–486, 427/115; 347/55
See application file for complete search history.

(56) References Cited

U.S. PATENT DOCUMENTS

| | | | | |
|---|---|---|---|---|
| 4,264,641 A | * | 4/1981 | Mahoney et al. | 427/483 |
| 4,795,330 A | * | 1/1989 | Noakes et al. | 425/6 |
| 5,344,676 A | * | 9/1994 | Kim et al. | 427/468 |
| 6,331,330 B1 | * | 12/2001 | Choy et al. | 427/475 |
| 6,776,844 B2 | * | 8/2004 | Yonekura et al. | 118/621 |
| 2007/0101934 A1 | * | 5/2007 | Nishio et al. | 118/629 |

* cited by examiner

*Primary Examiner* — Yewebdar Tadesse
(74) *Attorney, Agent, or Firm* — Pauley Petersen & Erickson

(57) ABSTRACT

A method and apparatus for electrostatic spray deposition (ESD) for fabricating a thin-layer yttria-stabilized zirconia (YSZ) electrolyte on a solid oxide fuel cell (SOFC) anode substrate constructed of nickel-YSZ cermet. By reducing the thickness of the electrolyte, and thereby reducing the cell internal IR drop, an intermediate temperature SOFC (IT-SOFC) can operate at 600-800° C. A collar positioned at a distance from a discharge end of a spray nozzle enhances a spray pattern of a precursor including the electrolyte material and thus provides a very thin electrolyte layer.

20 Claims, 12 Drawing Sheets

ESD, V=5.1 kV, h=20, I=5 ml/hr, c=0.5 w%, T=150 °C, t=50 min.

ESD with a collar, V=8.5 kV, h=20, l=4 ml/hr, c=1 w%, T=125 °C, t=60 min.

(a) Before sintering  (b) After sintering at 1300 for 3 hr

METHOD AND APPARATUS FOR ELECTROSTATIC SPRAY DEPOSITION FOR A SOLID OXIDE FUEL CELL

This Patent Application is a continuation-in-part of U.S. patent application Ser. No. 10/701,396 filed on 04 Nov. 2003, now U.S Pat. No. 7,252,851, issued 07 Aug. 2007, the disclosure of which is incorporated into this Patent Application by reference.

BACKGROUND OF THE INVENTION

1. Field of the Invention

This invention relates to electrostatic spray deposition techniques for applying an electrolyte material to a substrate, such as for a solid oxide fuel cell, wherein a precursor including the electrolyte material is discharged from a spray nozzle that has a collar positioned about the nozzle, for applying a relatively thin layer of the electrolyte material on the substrate surface.

2. Discussion of Related Art

Conventional electrostatic spray deposition (ESD) methods and apparatuses have been used to apply an electrolyte material to an anode structure of a solid oxide fuel cell (SOFC), but the conventional methods and apparatuses currently produce state-of-the-art electrolyte layers each having a thickness of 30-40 μm.

With conventional designs, one disadvantage is that materials and structures used to construct SOFC components cannot operate effectively at temperatures lower than 900° C.-1000° C., which is a temperature range at which conventional SOFC components operate. Yttria-stabalized zirconia (YSZ) is typically used as an electrolyte material because of its chemical stability and strength properties. However, even at a temperature of 1000° C., the specific ionic conductivity is relatively low, for example about 0.1 $\Omega^{-1}cm^{-1}$, and thus a thickness of the electrolyte layer must be relatively small. At higher operating temperatures of a conventional SOFC, a grain-boundary morphology connected with segregation, sintering, etc., can vary and thus reduce long-term and cycling stability of the conventional SOFC. In the industry, there is considerable effort to define and manufacture ceramic materials suitable for an intermediate temperature (IT) SOFC that has better stability than that of a conventional SOFC. One important requirement for improving a SOFC cell structure is to minimize an overall voltage loss of the SOFC.

Various conventional SOFC designs may be classified as electrolyte-supported, anode-supported and cathode-supported. The cathode-supported design is rarely used. In a planar cell the supporting cell component must provide sufficient mechanical strength to span a cell width, which is typically 10-20 cm. Thus the supporting cell component should be thicker than the other two components, and may even be thicker than an inter-connect (IC) layer if the IC layer is not designed for structured support, for example an IT-SOFC having a thin metallic foil for the IC layer. An electrolyte-supported SOFC usually has YSZ disks of approximately 100 μm thickness, on which relatively thin electrodes, each about 10 μm thick, are screen-printed. At an operating temperature of 1000° C. such an electrolyte layer thickness is tolerable, but at an operating temperature of 600-800° C., the electrolyte layer thickness must be much less, for reasons discussed below.

In a tubular design developed by the business entity Siemens-Westinghouse, the cathode is used as the supporting layer and thus has a cathode thickness of approximately 2 mm, which easily causes excessive polarization at relatively high current densities. The polarization is much less for an anode of comparable thickness, at least with hydrogen as a fuel. Anode-supported cells normally include a pre-fabricated relatively thick anode, on which a relatively thin electrolyte layer is deposited. The anode of an anode-supported SOFC is usually pre-sintered at a relatively low temperature to strengthen the anode, without significant shrinking. The YSZ electrolyte is then slurry-coated and sintered to the required temperature. The cathode is also slurry coated and sintered in a separate step.

Table 1 identifies properties of materials used in various cell components of a conventional tubular SOFC. The higher operating temperatures, around 1000° C., of the conventional SOFC limits the number of materials available for the cell components, because of a need to satisfy stringent criteria for chemical stability in oxidizing and reducing environments, for chemical stability of contacting materials, for conductivity, and for thermo-mechanical compatibility.

TABLE 1

Specifications of SOFC Components in Tubular SOFC

| Component | Conventional Properties |
| --- | --- |
| Anode | Ni/ZrO$_2$ cermet (Y$_2$O$_3$ stabilized ZrO$_2$) Electrochemical Vapor Deposition (EVD) or Slurry deposition (EVD expected to be replaced by anode sintering) Thermal Coefficient of Expansion (TEC) 12.5 × 10$^{-6}$ cm/cm ° C. ~150 μm thickness 20-40% porosity |
| Cathode | Sr or Ca doped lanthanum manganite (SLM) Extrusion, sintering ~2 mm thickness TEC 11 × 10$^{-6}$ cm/cm ° C. Expansion from room temperature to 1000° C. 30-40% porosity |
| Electrolyte | Yttria (8 mol %) stabilized ZrO$_2$ (YSZ) EVD TEC 10.5 × 10$^{-6}$ cm/cm ° C. Expansion from room temperature to 1000° C. 30-40 μm thickness |
| Cell Interconnect | Mg doped lanthanum chromite Plasma spray TEC 10 × 10$^{-6}$ cm/cm ° C. ~100 μm thickness |

The physical limitations of current materials make apparent a need to develop cells with composition of oxides and metals that operate at intermediate temperatures in a range of 600-800° C.

Conventional SOFC designs make use of thin film concepts where films of electrode, electrolyte, and inter-connect material are deposited on one another and sintered, to form a cell structure. The state-of-the-art YSZ electrolyte in a SOFC operating at 1000° C. must be about 25-50 μm to keep the ohmic loss to a level comparable to that of the liquid electrolyte in a conventional PAFC. In manufacturing the tubular SOFC, dense YSZ layers of about 40 μm thickness are often fabricated by an Electrochemical Vapor Deposition (EVD) method, as well as by tape casting and other ceramic processing technologies.

A lower limit of the thickness of a YSZ electrolyte layer or another ceramic membrane is in part a function of the production process such as EVD, tape casting or other processes. The electrolyte layers deposited not only should be very thin and 100% dense, but should also have uniform composition and optimal microstructure. The electrolyte film should have sufficient mechanical strength to withstand the thermal stresses occurring due to start-up, shut-down, and other temperature swings during operation. As the thickness is reduced, the microstructure of the film becomes more important to adequately reduce ohmic resistance. It is believed SOFC with a thin-film electrolyte having a grain size of 100 nm or less can produce an overall electrolyte resistance at an acceptable low level.

With the IT-SOFC, whether or not using current electrolyte materials such as YSZ, there is a need to reduce resistance or ohmic losses that occur across mixed ionic-electronic conducting electrodes as well as ionic conducting electrolyte. Main ohmic losses are related to the electrolyte. Thus, there is an apparent need to reduce a thickness of the electrolyte layer. When the electrolyte layer is a relatively thin film, such as having a thickness of 5-15 µm according to this invention, its resistance at intermediate temperatures is comparable to, or less than, that of a conventional electrolyte layer having a thickness of 30-40 µm, and operating at 900-1000° C. There is a need to reduce an electrolyte layer thickness to 5-10 µm, or perhaps less, for SOFC operation at 600-800° C. To maintain IT-SOFC power densities well above those of the high-temperature SOFC, it may be necessary to reduce the thickness of the YSZ electrolyte layer to only a few micrometers.

SUMMARY OF THE INVENTION

It is one object of this invention to provide a method and apparatus for fabricating a SOFC, particularly using electrostatic spray deposition (ESD) technology. With a colloidal solution of YSZ, a NiO-YSZ anode-supported planar thin-film SOFC can be manufactured, with a final electrolyte layer thickness, after sintering, of 4-10 µm. To put the ESD method of this invention in perspective, various techniques of electrolyte deposition are discussed with respect to speed of deposition, mechanical strength, and uniformity of the product layer.

ESD methods can be divided into three categories, depending on how the material to be deposited is supplied, as a powder or a precursor, and on the medium in which it is moving toward a substrate. In Category 1, electrolyte particles can be suspended in a liquid and the resulting slurry is applied to the substrate. In Category 2, electrolyte particles or their solid precursors can be convected through a gas phase or a plasma toward the substrate. In Category 3, solid or liquid precursors can be evaporated and travel through the gas phase or plasma, often while reacting with the medium or among themselves, to form a deposit on the substrate.

With Category 1, the traditional ceramic techniques such as slurry coating, tape casting, and screen printing can be used. Category 2 uses various spray and sputtering processes, such as spray pyrolysis, plasma spraying, laser spraying, radio-frequency sputtering (RFS) and magnetron sputtering. Category 3 uses electrochemical vapor deposition (EVD), chemical vapor deposition (CVD), chemical aerosol deposition technology (CADT), laser evaporation, electron-beam (EB) evaporation, and plasma-enhanced CVD. An example of CVD is described as plasma-enhanced metal organic CVD (PE-MOCVD).

With regard to SOFC electrolyte deposition, Categories 1-3 can be generally characterized. The traditional ceramic processes of Category 1 are relatively inexpensive and have satisfactory production rates. However, without tight control of particle-size distribution and rheology of slurries, the Category 1 processes lack the required quality associated with deposit microstructure, particularly uniformity. Category 1 techniques require post-deposition annealing at high temperature for complete densification. Among the Category 2 processes, plasma processes such as plasma spraying have been adopted by SOFC developers because they appear to allow better one-step control of microstructure, due to rapid quenching from plasma conditions, and have reasonably high rates. However, the deposits produced are usually not 100% or completely dense and thus require some post-process annealing. This adds to the cost of the plasma process, which is relatively expensive. Sputtering processes also produce deposits, which generally have appreciable porosity, but magnetron sputtering can produce dense thin electrolyte layers at relatively low temperatures. However, the deposition rate of sputtering processes is far less than those of spray processes, which is one disadvantage in fabricating other than the thinnest membranes.

The microstructure produced by the Category 1 process and by the plasma Category 2 process depends to a considerable extent on a size of the source particles. Uniform product microstructure requires a narrow size distribution of the source particles. Superior product strength and conductivity require a small grain size, which can be accomplished by starting from very small-sized source material. Thus, in the traditional ceramic Category 1 process and the plasma Category 2 process, the deposition process itself is one-step and relatively simple, but the benefit gained by eliminating multi-step processing is countered by the burden and expense of powder preparation and processing under rigorous quality control conditions.

One interest in Category 3 processes is that, in principle, they avoid this disadvantage of the Category 1 and 2 processes and are based on more rational one-step process without introducing pre-fabricated particles. Particle formation, followed by agglomeration on the substrate, is either side-stepped, as in EVD and CVD, or carried out in situ, as in CADT and to some extent in PE-MOCVD. The in-situ formation of particle-precursors, nuclei, or particles takes place in a gaseous medium or plasma, and this process can be designed and controlled, like in a chemical reactor. Likewise, particle agglomeration onto the substrate can be controlled by suitable regime of convection, diffusion, and migration in an electric field, if applicable. But one disadvantage of some of the Category 3 processes is that the very complicated nature of the gas-to-solid process kinetics makes design optimization and control difficult. Also, in practice, the deposition rates are low. In cases where the gas-phase transport and reaction processes are relatively straightforward, as in EVD, the growth rate may be slow because it is controlled by solid-state diffusion in the deposit film.

Thus, there is an incentive to develop a process that combines some of the attractive steps or features of the Category 3 chemical-reactor like processes with those of the particle-based deposition processes. One ESD process described in this specification has several features of such a combination.

ESD uses solutions or very fine near-colloidal suspensions of one or more precursor materials of the material to be deposited, such as YSZ. Atomization, in this case electrostatic atomization, is used to disperse each solution or suspension into a gaseous atmosphere. The drops undergo a rapid, but controlled, evaporation process. The resulting precursor particles react within the controlled mini-reactor formed by the evaporating droplet.

The ESD process of this invention is similar to other known deposition processes in which the precursor is dispersed in the form of drops. A liquid can be dispersed by several methods, such as blast atomization by a stream of gas at high velocity, ultrasonic atomization by ultrasonic irradiation, and/or electrostatic atomization by applying a high DC voltage. In blast and ultrasonic spray processes, the drops can then be subjected to intense heating to achieve a certain degree of drying and agglomeration, spray drying, or pyrolysis, spray pyrolysis, while the resulting particles are convected to the substrate, where deposition and, if desired, final agglomeration occur. Under tightly controlled fluid dynamic conditions, this creates layers of reasonably uniform composition but imperfect density, so that high-temperature annealing is necessary to achieve 100% or complete density.

ESD uses electrostatic charging to disperse the liquid. One advantage of electrostatic dispersion is that the unipolar, usually positive charge helps to achieve a very small drop size. The charge also prevents coalescence of drops and thus agglomeration of particles, during flight. Also, the electric field provides a high degree of control over the direction of flight and the distribution of the rate of deposition over the substrate. Indirectly, the electrostatic technique, because it can produce extremely fine, almost uniformly sized drops, also provides significant control over the extent of the precursor reaction and the morphology, such as the crystal structure and the grain size, of the product particle formed. Also, if very small drops and thus particles are generated, then elevated temperatures are not necessary to achieve a heterogeneous reaction and interdiffusion necessary for satisfactory uniformity of the product particles and the deposit layer. High gas temperatures in the reactor, typical for spray pyrolysis, can then be avoided, and even post-deposition annealing may be unnecessary. Thus, the ESD process of this invention seems particularly suited to electrolyte deposition at relatively low temperatures, as desirable for the IT-SOFC.

Uniform layers of oxides can be deposited by ESD at relatively low temperatures, as demonstrated by research focusing on lithium battery electrode materials. ESD can be used to deposit porous layers of lithium cobaltate and lithium manganate spinel of a few tens of μm thickness, starting from liquid solutions of precursors. According to this invention, it is possible to deposit porous layers of SOFC electrode materials, doped lanthanum manganate, and mixed nickel oxide-YSZ, similarly by ESD. Zirconia electrolyte can be deposited by an electrostatic spray process. YSZ thin films can be deposited onto porous anode substrates by electrostatic spray pyrolysis. ESD appears to differ from electrostatic spray pyrolysis only by a deliberate emphasis on creating the conditions for a deposit of well-defined properties.

The ESD technique can be used to prepare tetragonal zirconia films with simple set-up, a wide choice of precursors, a relatively large film growth rate, an ambient atmosphere operation, a good control of the morphology of the deposited layers and a good control of stoichiometry compared to deposition techniques such as RF sputtering, sot-gel method, CVD or MOCVD, and injection-LPCVD.

It is one object of this invention to use ESD for thin-layer YSZ deposition, and to provide operating conditions necessary to produce near 100% density.

BRIEF DESCRIPTION OF THE DRAWINGS

The above and other features of this invention are apparent when this specification is read in view of the drawings, wherein.

DESCRIPTION OF PREFERRED EMBODIMENTS

YSZ deposition can be conducted using suspensions of YSZ powder in organic fluids. ESD is a versatile technique that can be adapted to both solutions and suspensions or emulsions, and to various organic and mixed aqueous/organic solvents or electrolyte solutions. For YSZ depositions, there are two main possibilities. One possibility is to use spray deposition from a solution of a precursor. Another possibility is to use colloidal or near-colloidal suspensions of YSZ or of yttria and zirconia separately. Each approach has its own merits.

In one embodiment of this invention, a colloidal suspension of YSZ is used. Advantages of ESD using a colloidal solution include: (1) that no chemical reaction occurs during the dispersion and deposition process, and thus optimization of operating conditions is simpler and the chemical composition of the deposit is a priori uniform; (2) that low-temperature operation is adequate because breakdown or reaction of precursors, requiring high gas or substrate temperature, is not involved; and (3) the maximum flexibility of operating conditions, which helps optimize the process regarding dispersion, evaporation, and deposition. It is also possible to optimize ESD operating conditions with respect to precursor reaction and product uniformity.

In one embodiment of this invention, the cell assembly matches, as much as possible, the thermal expansion coefficients of the anode and electrolyte materials. This allows in-cell testing of the assembled cell with focused analysis of how the anode pores are covered by the thin electrolyte layer. Thus a, Ni/YSZ composite material can be used for the anode. The choice of this composite material also allows flexibility of porosity and pore size, which is needed to ensure a large enough effective surface area for electrochemical oxidation. In one embodiment, the anode-supported cell design is used, which requires a minimum thickness of 100-200 μm. Thus the anode can be prepared by hot-pressing a NiO/YSZ powder mixture, and the reduced anode can be a substrate for YSZ deposition.

Figure 1:
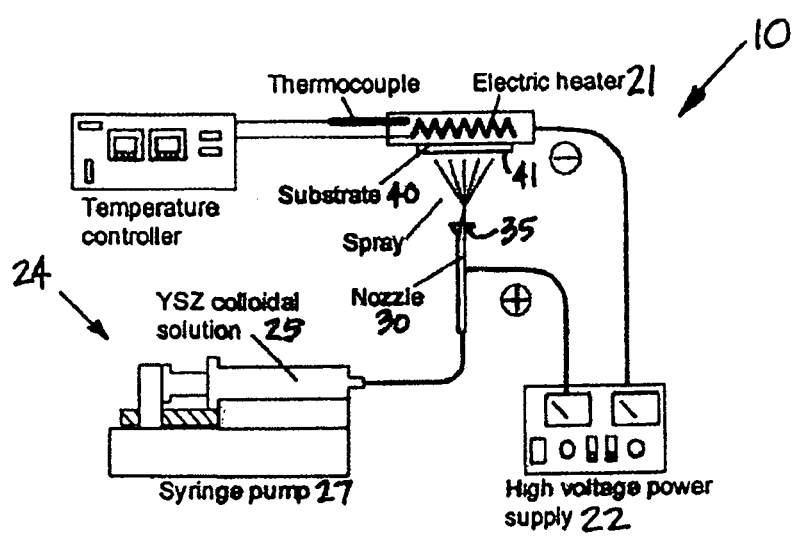
FIG. 1 is a schematic diagram of an electrostatic spray deposition apparatus, according to one embodiment of this invention.

In one embodiment, 8 mol % YSZ from a commercial source, such as Tosoh Corporation, in Japan, can be ball-milled in a glass bottle for 18 hours with zirconia balls of 3 mm diameter. The milled YSZ can then be dispersed in ethanol and filtered, preferably at less than 0.8 μm. Then the concentration of YSZ in ethanol is about 0.1 w %. FIG. 1 shows a schematic diagram of an ESD apparatus 20 according to one embodiment of this invention. The ESD apparatus 20 comprises a nozzle 30 with a pump 27 or a syringe as a liquid source 24 or supply, a hot plate 21, and a high voltage power supply 22. The distance between the nozzle 30 and the hot plate 21 is adjustable. The nozzle 30 and/or the hotplate 21 can be mounted inside a controlled-atmosphere box. The nozzle 30 can be pointed upward, away from gravitational forces. The substrate 40, such as a pre-sintered anode, can be fixed onto the hot plate 21, and preferably pointed downward. A high DC voltage is applied between the nozzle 30, such as a positive polarity, and the substrate 40. The YSZ colloidal suspension can be supplied to the nozzle 30 with a syringe pump 27 or any other controlled pump.

The ESD method and apparatus of this invention have many independently variable operating parameters, including: precursor concentration in the feed solution or suspension; particle size of feed solution, in the case of suspension; solution or suspension medium; feed flow rate; nozzle tip shape; distance between the nozzle and the substrate; applied voltage; substrate material; substrate temperature; and ambient gas composition, temperature, and pressure. In one embodiment of this invention, each of the following parameters were fixed: the concentration of YSZ in the suspension medium, for example 0.1 w %; the YSZ particle size, for example less than 0.8 μm; the suspension medium, for example ethanol; the substrate material, for example pre-sintered NiO-YSZ cermet, anode pellet; and the ambient gas, for example air at room temperature and atmospheric pressure.

The other five parameters were varied, including: the feed flow rate (l), the nozzle tip shape, the nozzle-substrate distance (h), the applied voltage (V), and the substrate temperature (T). The effect of suspension concentration on dispersion characteristics or the spray shape can be determined. The effects of the variable operating parameters on liquid dispersion and deposit character can be determined, qualitatively. In addition to the anode substrate, a slide glass can be used to observe deposits.

Figure 2:
FIG. 2 is a diagram showing a laser sheet image of Type I spray, according to this invention.

In one embodiment of this invention, the electrostatic spray is not stable during the first 10 minutes of operation of the method. Observations of spray patterns are made after 30 min of operation, and recorded as laser sheet images. FIG. 2 shows a typical image of the spray pattern produced according to this invention. The spray pattern shown in FIG. 2 has very uniform density, perpendicular to the spray axis. FIG. 2 shows an example of Type I spray, as discussed in this specification.

Figure 3:
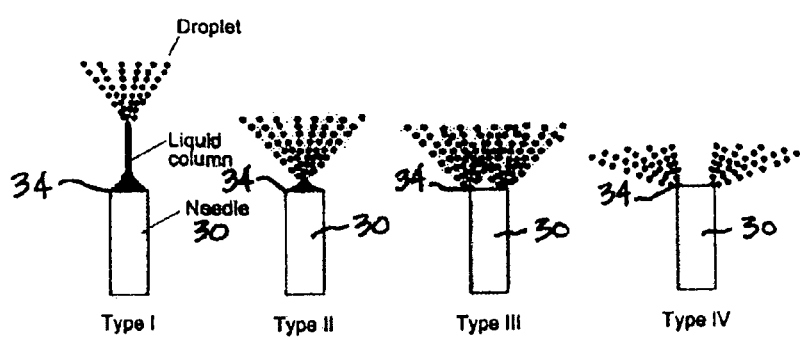
FIG. 3 is a diagrammatic view showing Types I-IV of spray dispersion.

A nozzle or needle 30 with an orifice or opening 32 cut perpendicular to a longitudinal axis of the nozzle can produce at least four types of spray, Types I-IV, as shown in FIG. 3.

In Type I, the feed liquid forms a cone with its base at the orifice of the needle type nozzle 30, and a thin cylindrical column extends from an apex of a cone. The column breaks up into droplets. The spray angle is narrow.

In Type II, the feed liquid forms a cone as in Type I but there is no liquid column extending from the cone. The tip of the cone breaks up into droplets.

In Type III, the feed liquid breaks up into a spray, almost immediately as the feed liquid emerges from the orifice and depending on the particular nozzle configuration, there can be one to five break-up points.

In Type IV, the spray pattern is similar to Type III, but the spray angle is very wide and the spray has a hollow core.

Table 2 summarizes how the variable operating parameters in one embodiment of this invention affect spray type. From Type I to Type IV, the spray angle increases, significantly in the transition to Type IV. This causes a decrease in lateral uniformity of the spray and thus a decrease in uniformity of the deposit.

TABLE 2

Effect of various operating parameters on spray type.

| Parameter | Change in spray type |
|---|---|
| c ↗ | Type I to Type IV |
| h ↗ | Type IV to Type I |
| V ↗ | Type I to Type IV |
| l ↗ | Type IV to Type I |
| T ↗ | Type I to Type IV |

Figure 4:
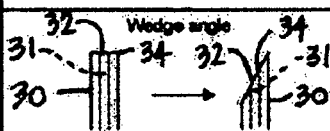
FIG. 4 is a table showing the effect of a shape of a nozzle tip on a spray type.

The shape of the nozzle tip can significantly affect the type of spray, as shown in FIG. 4, as well as the stability of the various spray types, for example the range of an operating parameter over which the spray remains of a certain type. For example, a sharp wedge-shaped nozzle tip keeps the Type I spray stable over a wide range of the variable operating parameters. In another embodiment, a fine flat-cut nozzle keeps the Type III spray stable over a wide range of the variable operating parameters.

In addition to a transition due to controlled variation of operating conditions, a gradual change over time from Type I to Type IV occur. This change may be slow or rapid, depending on operating conditions can be particularly affected by the nozzle tip design, for example due to interior surface changes and/or relatively small changes in the distance between the nozzle tip and the substrate, particularly as the deposit thickens.

For maximum stability, a Type III spray, a fine flat-cut nozzle can be used. The flow rate can be varied over a wide range, and good stability can be achieved at flow rate of 5-10 ml/h. Under optimal stability conditions, a maximum growth rate of the layer thickness in one embodiment of this invention is about 10 μm/h.

It is important to achieve an uniform deposit thickness of the electrolyte layer 45, for successful use of ESD in SOFC construction. This uniformity can depend largely on the lateral uniformity of the dispersion which can depend on the spray angle, but also on the nozzle tip-substrate distance (h), which can be varied between 20 and 40 mm.

Figure 5:
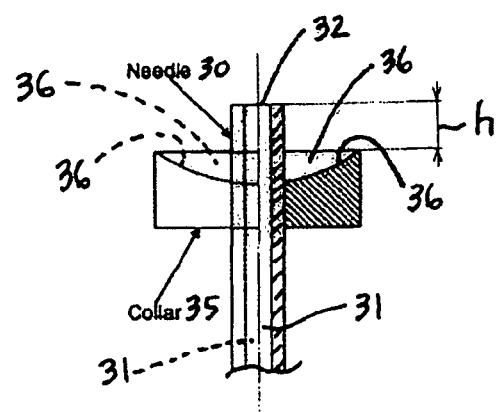
FIG. 5 is a partial cross-sectional view of a nozzle and a collar, according to one embodiment of this invention.

With a non-uniform electric field between nozzle tip and the substrate, an increase in the distance h can result in better uniformity. However, increasing the distance h can lead to an increase of deposition area, particularly as the spray cone opens. This increases the time necessary to reach a certain electrolyte layer deposit thickness. To suppress the increase of deposition area, the spray angle can be decreased by channeling the electrostatic field adjacent or immediately near the nozzle tip or the discharge end 34 of the nozzle 30. FIG. 5 shows a collar 35 attached to the nozzle 30 to alter the spray angle, for example to narrow the spray angle. The material of the collar 35 can be aluminum, silicon rubber or any other suitable material or material composite.

Figure 6:
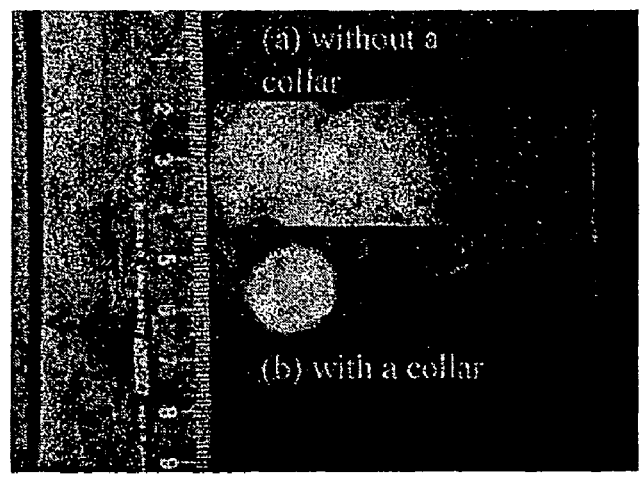
FIG. 6 is a view of an effect of a collar on a deposit area.

The location of the collar 35 with respect to the nozzle tip or discharge end 34 is a dominating factor for achieving a narrow and uniform, yet stable, dispersion for spray pattern. FIG. 6 shows how the collar 35 can decrease the deposition area.

Figure 7:
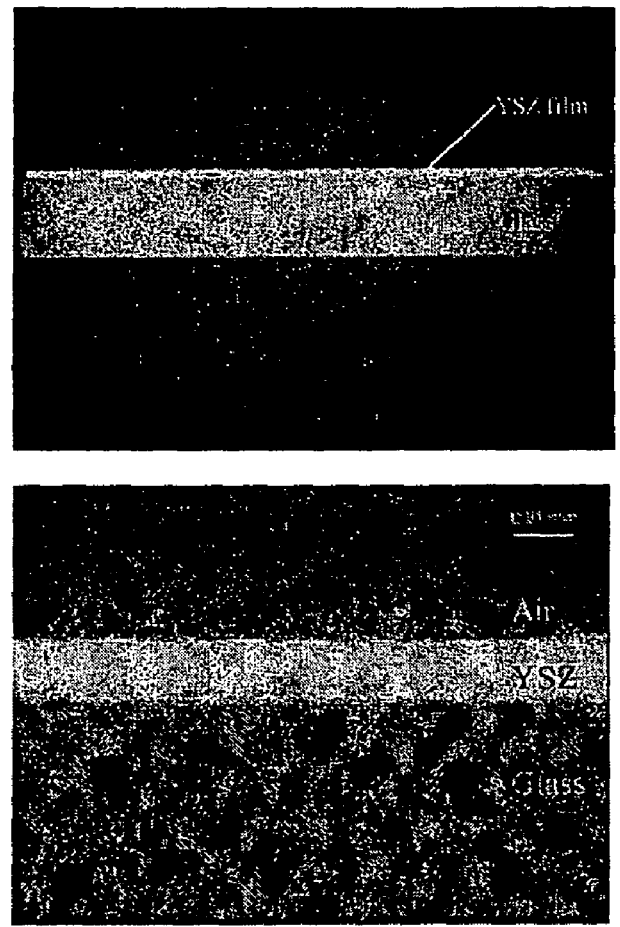
FIG. 7 is a view of a cross section of a 10 μm YSZ layer on a glass slide having a 100 μm thickness.

Non-uniform heating of the electrolyte layer 45 can cause delamination of cell components and decrease a useful lifetime of cells. Thus, the electrolyte layer thickness should be uniform. FIG. 7 shows the cross section of a 10-μm YSZ deposit on glass 48, where the glass thickness is 100 μm. The YSZ film thickness is uniform with no defect. The thickness profile of a deposit on glass such as that shown in FIG. 7 can be measured quantitatively by digitally recording the light intensity transmitted across the electrolyte layer 45 with uniform backlighting.

Figure 8:
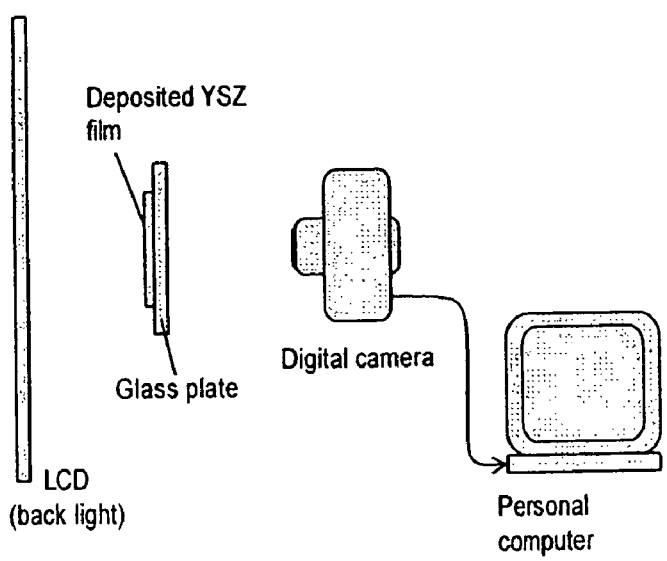
FIG. 8 is a diagrammatic view of a measurement method of a YSZ thickness profile.
Figure 9:
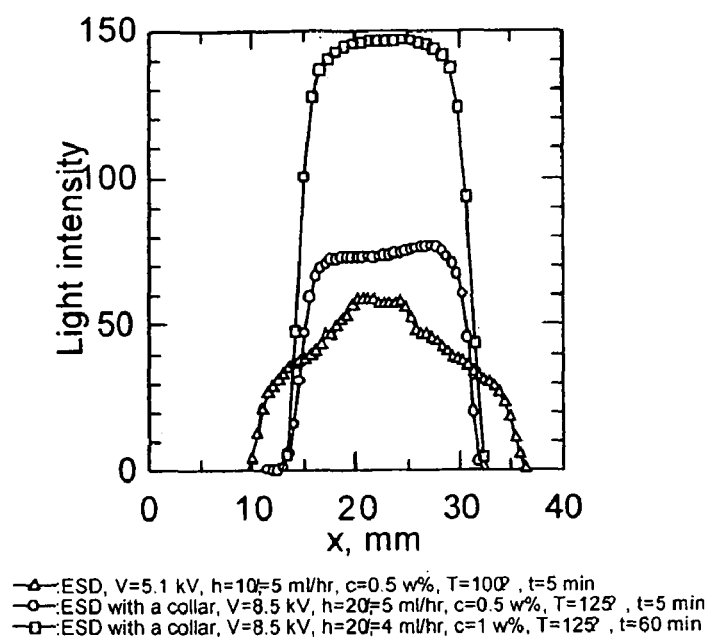
FIG. 9 is a graphical representation of thickness profiles of YSZ layers.

FIG. 8 shows the measurement system, and FIG. 9 shows a graphical representation of the results obtained with the measurement system shown in FIG. 8. The effect of the collar 35 is clearly shown in FIG. 9. With increase of deposition time (t), the thickness profile around the center of deposition area becomes flat. Any non-uniformity may be caused by unsteady spray distribution in the beginning of the method.

Figure 10:
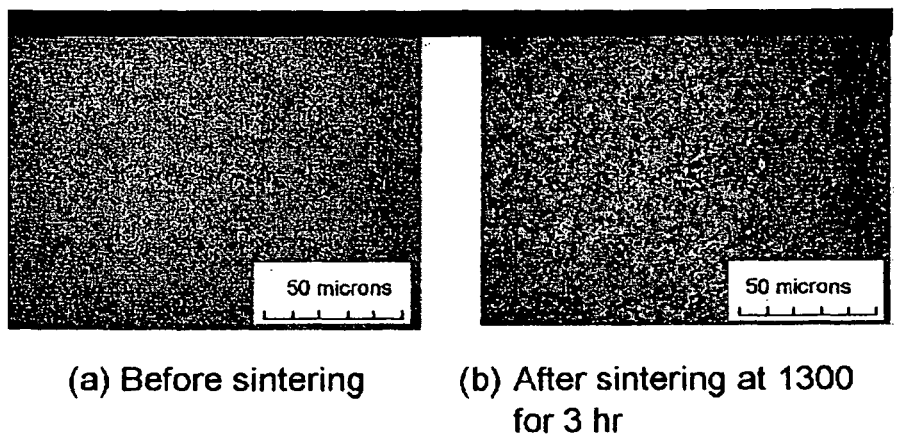
FIG. 10 is a view showing a sintered YSZ layer, having a thickness of 10 μm, before sintering and after sintering, in a top view.
Figure 11:
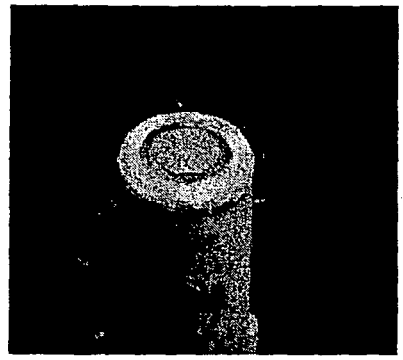
FIG. 11 is a view of a sintered cell assembly fixed onto a zirconia tube, according to one embodiment of this invention.
Figure 12:
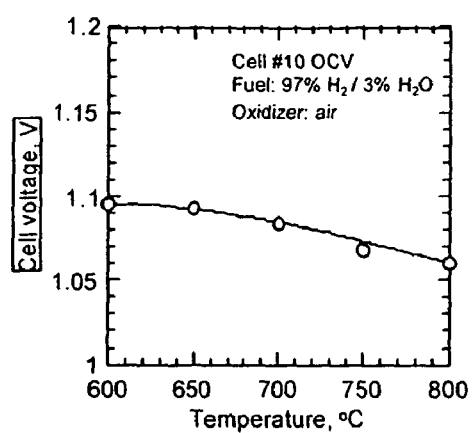
FIG. 12 is a graphical representation of cell voltage of a typical cell as a function of temperature.

To assure complete densification, the YSZ layers deposited on the anode substrate can be sintered, for example at 1250-1400° C. for 1 to 2 hours. YSZ particles begin to sinter around 900° C. If sintered at such a low temperature, the required duration is relatively long. Thus, it is possible to sinter at a temperature above 900° C. The sintered YSZ layer is transparent and its surface is slightly wrinkled, as shown in FIG. 10. The wrinkles may be formed during the cooling process.

In one embodiment of this invention, a well-defined temperature program during sintering produces favorable results. The effectiveness of the temperature program can be determined by post-sintering in-cell checks of gas-tightness. Micro-cracks in the sintered YSZ layer are difficult to see, even with an optical microscope. Some defects caused by sintering ESD-generated YSZ layers on the anode substrate can be observed.

A method according to this invention for ESD of an electrolyte material begins with forming a solution 25, which includes a precursor of the electrolyte material 45. A mixed aqueous/organic solvent can be used as the medium for dissolving one or more electrolyte precursors while simultaneously suspending micron and/or submicron sized electrolyte particles. The mixed solvent, for example including water in an amount of about 1% to about 50% of the solution, can allow the ESD to be operated at a relatively lower applied voltage, and can also provide enhanced control of evaporation of the drops and thus the wetness of the deposit surface laser at impact on the anode substrate. Solution 25 is discharged through the opening 32 of the nozzle 30. A collar 35 is positioned at a distance, in an upstream direction with respect to a downstream flow direction of the solution, from the discharge end 34 of the nozzle 30. The solution 25 is sprayed onto the surface 41 of the substrate 40.

As shown in FIG. 5, the collar 35 has an inside surface 36 which faces the nozzle 30. At least a portion of the inside surface 36 diverges in the downstream flow direction. The inside surface 36 can be conical, straight, curved, or can have any other suitable shape to accommodate a desired spray pattern.

According to this invention, any one or more features of the inside surface 36 of the collar 35 can be designed to achieve a different spray pattern of the solution 25 discharged from the nozzle 30. For example, the distance h as shown in FIG. 5 can be varied to change the spray pattern. Also, the rate at which the inside surface diverges in the downstream direction can be varied to change the spray pattern. The potential difference of the voltage source 22 can be varied and/or the distance between the discharge end 34 of the nozzle 30 and the surface 41 of the substrate can be varied to change the spray pattern. Any other structural, electrical and/or chemical feature that affects the spray pattern can be varied to change the spray pattern. The particular spray pattern can affect the deposition characteristics of the electrolyte layer 45.

A periodicity in the break-up of the jet issuing from the nozzle 30 and the degree of aggregation of the particles within a drop can be generated by modulating the applied voltage and/or by controlling the pressure and/or composition of the ambient atmosphere. The periodicity effect can be provided by a single solvent jet issued from the nozzle 30. This effect can be enhanced by using a mixed aqueous/organic solvent as the medium for dissolving one or more electrolyte, such as YSZ, precursors. The periodic break-up pattern can be used to generate drops containing electrolyte particles and adherent precursor separately from smaller drops containing only the precursor, which can be an advantage for forming dense green pre-sintering deposits.

The periodic break-up of the jet or the spray pattern can be achieved and/or enhanced by choosing a specific ratio of the inside nozzle diameter, such as shown in FIG. 4, and a particle diameter size. For a nearly or substantially monodisperse suspension issuing from the nozzle 30, the nozzle inside diameter is preferably larger than the particle diameter by about one or more, possibly a few, times a thickness of an electric double layer on the particle. This thickness is controlled by the ionic strength of the mixed solvent and can be optimized using a particular composition of the solvent. Under certain conditions, the periodic break-up pattern is provided by electrokinetic forces acting on the electrolyte particles during passage through the nozzle 30, and can generate drops containing electrolyte particles and adherent precursor separately from smaller drops containing only precursor, which can be advantageous for relatively dense deposit formation.

The electrolyte layer 45 is then preferably sintered at a temperature of about 1250° C. to about 1400° C., for a time period of about 1 hour to about 6 hours. Then, a cathode layer is applied to the sintered relatively thin electrolyte layer 45. Preferably but not necessarily, the surface 41 of the substrate 40 is maintained at a temperature in a range of about 250° C. to about 300° C.

In the method according to this invention, it is prudent to check for: warping of the bilayer or cell when the shrinking force of the YSZ layer is too high for the mechanical strength of the anode; growth of NiO crystals across the YSZ layer which occurs when YSZ and NiO in the anode pellet are not mixed sufficiently; spot-peeling of the YSZ layer which can occur if the layer thickness is not uniform; and/or large cracks that occur when the temperature program of the sintering process is not optimal.

After sintering the YSZ layer deposited on the anode substrate, a cathode material can be applied or coated on the YSZ layer, for example by brush-coating or by precipitation. For example, a three-layer cell assembly can be sintered at 1200° C. for 1 hour, following a sintering program.

In one embodiment of this invention, a porous LSM layer can be produced by ESD, following a process similar to known processes for depositing $LiCoO_2$ or $LiMn_2O_4$ layers. After the sintering step of this invention, platinum-mesh current collectors can be attached to both of the anode and the cathode with platinum ink, and the entire assembly can be heated to ensure good bonding. Current and potential leads can be similarly attached and bonded.

In one embodiment of this invention, cells each having a specific diameter and thickness, for example about a 20.5-mm diameter and about a 1-mm thickness, are attached across the top of a 19.5-mm inner diameter (ID), 25.4-mm outer diameter (OD), 50-cm long zirconia pipe and sealed in place with several layers of ceramic cement, such as shown in FIG. 11.

In an experiment conducted according to this invention, test cells were slowly brought to a temperature of 800° C., and operated at 800° C., and FIG. 11 shows an open circuit voltage obtained over a temperature range 600-800° C. FIG. 11 shows that the gas-tightness of the cell assembly is satisfactory, and that there are no electrical leaks by inadvertent contact of electric leads.

According to this invention, ESD of a thin-layer YSZ electrolyte material for an IT-SOFC is very suitable for maintaining uniformity of thickness in thin-layer production, because even at relatively low flow rates of ESD, the droplet size of the spray can be reduced and a cone angle of the spray can be controlled to optimize deposit uniformity. Deposition in multiple layers to build up thickness is unnecessary according to the method and apparatus of this invention. According to this invention, it is possible to achieve electrolyte layers having a thickness less than 10 µm. With properly chosen operating conditions, it is possible to achieve micro crack-free electrolyte layers with good adhesion to the anode substrate. A cathode layer can then be deposited.

Many SOFC apparatuses can be mass-produced with the ESD of electrolyte according to this invention. The resulting operating temperature is low, and operation in air, with exhaust or recycling of ethanol vapor, is possible. For scale-up to larger cell areas the nozzle can be programmed to move over the extended surface, to maintain a degree of uniformity.

Although it is possible to have five operating variables as discussed in this specification, it is also possible to have several more variables to more precisely optimize the process. In particular, alternative choices for the suspension medium and the composition or pressure of the ambient atmosphere may affect the deposit.

The colloidal suspension of YSZ in ethanol chosen as feed liquid in this may be replaced by a solution of zirconia and yttria precursors, mixed or fed separately to the ESD apparatus of this invention. The deposition of the cathode material may also be realized by ESD, and might simplify the sintering program.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus for electrostatic spray deposition of an electrolyte material on a solid oxide fuel cell component, the apparatus comprising:
    a source containing a solution including an electrolyte material precursor and containing a particulate form of the electrolyte material;
    a nozzle having a passage in communication with the source and with an opening at a discharge end of the nozzle;
    a collar attached to and positioned at a distance from the discharge end of the nozzle; and
    a voltage source applying a potential difference between the nozzle and a substrate surface of the solid oxide fuel cell component;
    wherein a potential of a first polarity is applied to the nozzle and wherein a potential of a second polarity, opposite the first polarity, is applied to the substrate wherein the collar has an inside surface facing the nozzle, and at least a portion of the inside surface diverges in a downstream flow direction of the solution.

2. The apparatus according to claim 1, wherein the inside surface is conical.

3. The apparatus according to claim 1, wherein the inside surface is curved in the downstream flow direction.

4. The apparatus according to claim 1, further comprising a controller for varying a feed flow rate of the solution, varying a shape of a tip portion of the nozzle, varying a distance between the discharge end of the nozzle and the substrate surface of the solid oxide fuel cell component, varying a potential difference applied between the nozzle and the substrate surface of the solid oxide fuel cell component, and varying a temperature of the substrate surface of the solid oxide fuel cell component.

5. The apparatus according to claim 4, wherein the controller fixes a concentration of the electrolyte material in the solution, fixes a particle size of the electrolyte material in the solution, fixes a suspension medium of the solution, fixes a substrate material supporting the substrate surface of the solid oxide fuel cell component, fixes a temperature of the substrate surface of the solid oxide fuel cell component, and fixes conditions of an ambient gas surrounding the substrate surface of the solid oxide fuel cell component.

6. The apparatus according to claim 1, further comprising a heating element in thermal contact with the substrate surface of the solid oxide fuel cell component, and the heating element fixing a temperature of the substrate surface of the solid oxide fuel cell component.

7. The apparatus according to claim 1, wherein the solution comprises water in an amount of about 1% to about 50% of the solution.

8. The apparatus according to claim 7, wherein parameters of an ambient surrounding the apparatus is controlled to issue a periodic break-up pattern of the solution from the nozzle.

9. The apparatus according to claim 7, wherein the potential difference and the parameters are at least one of controlled and modulated to generate a dense deposit formation on the solid oxide fuel cell component.

10. The apparatus according to claim 1, wherein parameters of an ambient surrounding the apparatus is controlled to issue a periodic break-up pattern of the solution from the nozzle.

11. The apparatus according to claim 10, wherein the potential difference and the parameters are at least one of controlled and modulated to generate a dense deposit formation on the solid oxide fuel cell component.

12. The apparatus of claim 1, wherein an inside diameter of the nozzle is slightly larger than an outside diameter of a sphere comprising an electrolyte particle and an electric double layer surrounding the electrolyte particle.

13. The apparatus according to claim 1, wherein the collar is attached to the nozzle to alter an electrostatic field associated with a solution spray angle.

14. An apparatus for electrostatic spray deposition of an electrolyte material on a solid oxide fuel cell component, the apparatus comprising:
    a source containing a solution including at least one of a precursor and a particulate of the electrolyte material;
    a nozzle having a passage in communication with the source and with an opening at a discharge end of the nozzle;
    a collar attached to and encircling the nozzle and positioned at a distance from the discharge end of the nozzle; and
    a voltage source applying a potential difference between the nozzle and a substrate surface of the solid oxide fuel cell component;
    wherein a potential of a first polarity is applied to the nozzle and wherein a potential of a second polarity, opposite the first polarity, is applied to the substrate wherein the collar has an inside surface facing the nozzle, and at least a portion of the inside surface diverges in a downstream flow direction of the solution.

15. The apparatus according to claim 14, wherein the solution comprises water in an amount of about 1% to about 50% of the solution.

16. The apparatus according to claim 15, wherein parameters of an ambient surrounding the apparatus is controlled to issue a periodic break-up pattern of the solution from the nozzle.

17. The apparatus according to claim 15, wherein the potential difference and the parameters are at least one of controlled and modulated to generate a dense deposit formation on the solid oxide fuel cell component.

18. The apparatus according to claim 14, wherein parameters of an ambient surrounding the apparatus is controlled to issue a periodic break-up pattern of the solution from the nozzle.

19. The apparatus according to claim 18, wherein the potential difference and the parameters are at least one of controlled and modulated to generate a dense deposit formation on the solid oxide fuel cell component.

20. The apparatus of claim 14, wherein an inside diameter of the nozzle is slightly larger than an outside diameter of a sphere comprising an electrolyte particle and an electric double layer surrounding the electrolyte particle.

* * * * *